(12) United States Patent
Subramanian et al.

(10) Patent No.: US 10,774,008 B2
(45) Date of Patent: Sep. 15, 2020

(54) CERAMIC MATRIX COMPOSITE ARTICLES

(71) Applicant: General Electric Company, Schenectady, NY (US)

(72) Inventors: Suresh Subramanian, Clifton Park, NY (US); Mark Eugene Noe, West Chester, OH (US); James Dale Steibel, Mason, OH (US); Jason David Shapiro, Methuen, MA (US); Brandon ALIanson Reynolds, Cincinnati, OH (US); Kurtis C. Montgomery, Mason, OH (US); Jared Hogg Weaver, Clifton Park, NY (US); Daniel Gene Dunn, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 199 days.

(21) Appl. No.: 15/710,954

(22) Filed: Sep. 21, 2017

(65) Prior Publication Data

US 2019/0084892 A1    Mar. 21, 2019

(51) Int. Cl.
*C04B 37/00* (2006.01)
*C04B 35/80* (2006.01)
(Continued)

(52) U.S. Cl.
CPC ............ *C04B 37/001* (2013.01); *B32B 18/00* (2013.01); *C04B 35/573* (2013.01); *C04B 35/62844* (2013.01); *C04B 35/62884* (2013.01); *C04B 35/657* (2013.01); *C04B 35/80* (2013.01); *C04B 35/806* (2013.01); *F01D 5/282* (2013.01); *F01D 5/284* (2013.01); *F01D 5/288* (2013.01); *F01D 9/041* (2013.01); *F01D 11/08* (2013.01); *F01D 25/002* (2013.01); *F02K 1/822* (2013.01);
(Continued)

(58) Field of Classification Search
None
See application file for complete search history.

(56) References Cited

U.S. PATENT DOCUMENTS

| 4,005,575 A | 2/1977 | Scott et al. |
| 4,909,031 A | 3/1990 | Grieb |

(Continued)

FOREIGN PATENT DOCUMENTS

| EP | 1 676 824 A1 | 7/2006 |
| EP | 3 061 736 A1 | 8/2016 |

OTHER PUBLICATIONS

U.S. Appl. No. 15/427,324, filed Feb. 8, 2017.
(Continued)

*Primary Examiner* — David Sample
*Assistant Examiner* — Elizabeth Collister
(74) *Attorney, Agent, or Firm* — Dority & Manning, P.A.

(57) ABSTRACT

A ceramic matrix composite article includes a chemical vapor infiltration ceramic matrix composite base portion including ceramic fiber reinforcement material in a ceramic matrix material having between 0% and 5% free silicon. The ceramic matrix composite article further includes a melt infiltration ceramic matrix composite covering portion including a ceramic fiber reinforcement material in a ceramic matrix material having a greater percentage of free silicon than the chemical vapor infiltration ceramic matrix composite base portion.

20 Claims, 7 Drawing Sheets

(51) Int. Cl.
*C04B 35/657* (2006.01)
*C04B 35/628* (2006.01)
*F02K 9/97* (2006.01)
*F01D 11/08* (2006.01)
*F01D 25/00* (2006.01)
*F01D 5/28* (2006.01)
*F23R 3/00* (2006.01)
*C04B 35/573* (2006.01)
*F01D 9/04* (2006.01)
*F02K 1/82* (2006.01)
*B32B 18/00* (2006.01)

(52) U.S. Cl.
CPC .............. *F02K 9/974* (2013.01); *F23R 3/007* (2013.01); *C04B 2235/5244* (2013.01); *C04B 2235/5264* (2013.01); *C04B 2235/614* (2013.01); *C04B 2235/616* (2013.01); *C04B 2235/728* (2013.01); *C04B 2235/80* (2013.01); *C04B 2237/38* (2013.01); *C04B 2237/61* (2013.01); *F05D 2240/11* (2013.01); *F05D 2240/15* (2013.01); *F05D 2300/222* (2013.01); *F05D 2300/2261* (2013.01); *F05D 2300/6033* (2013.01)

(56) References Cited

U.S. PATENT DOCUMENTS

| | | | |
|---|---|---|---|
| 5,135,695 A | 8/1992 | Marcus | |
| 5,169,579 A | 12/1992 | Marcus et al. | |
| 5,340,656 A | 8/1994 | Sachs et al. | |
| 5,639,531 A | 6/1997 | Chen | |
| 5,876,550 A | 3/1999 | Feygin et al. | |
| 7,255,551 B2 | 8/2007 | Taylor et al. | |
| 7,296,398 B2 | 11/2007 | Moniz et al. | |
| 7,427,428 B1 | 9/2008 | DiCarlo et al. | |
| 7,882,693 B2 | 2/2011 | Schilling | |
| 8,206,637 B2 | 6/2012 | Dietrich et al. | |
| 9,074,485 B2 | 7/2015 | Suciu et al. | |
| 9,080,512 B2 | 7/2015 | Suciu et al. | |
| 9,523,149 B2 | 12/2016 | Lazur et al. | |
| 2002/0158946 A1 | 10/2002 | Schulte et al. | |
| 2005/0076504 A1* | 4/2005 | A. Morrison | F01D 5/282 29/889.72 |
| 2006/0231975 A1 | 10/2006 | Teulet | |
| 2010/0279845 A1* | 11/2010 | Kebbede | C04B 35/573 501/90 |
| 2011/0229337 A1 | 9/2011 | Carper et al. | |
| 2012/0076927 A1 | 3/2012 | Bhatt et al. | |
| 2013/0167374 A1 | 7/2013 | Kirby et al. | |
| 2015/0078888 A1 | 3/2015 | Golshany et al. | |
| 2015/0152783 A1 | 6/2015 | Acquisti | |
| 2016/0159698 A1 | 6/2016 | Landwehr | |
| 2016/0229753 A1 | 8/2016 | Schmidt et al. | |
| 2016/0251269 A1* | 9/2016 | Luthra | B32B 7/02 428/212 |
| 2016/0251270 A1 | 9/2016 | Steibel | |
| 2016/0333734 A1 | 11/2016 | Dowden et al. | |
| 2017/0059159 A1 | 3/2017 | Varney | |
| 2017/0136697 A1 | 5/2017 | Kia et al. | |

OTHER PUBLICATIONS

Xu, et al., Carbon/Silicon Carbide Composites Prepared by Chemical Vapor Infiltration Combined with Silicon Melt Infiltration, Carbon, vol. 37, Jan. 1, 1999, pp. 1179-1187, Abstract Only.

Xu, Y., et al., "Carbon/silicon carbide composites prepared by chemical vapor infiltration combined with silicon melt infiltration," Carbon, vol. 37, No. 8, pp. 1179-1187 (Jan. 1, 1999).

Extended European Search Report and Opinion issued in connection with corresponding EP Application No. 18192341.8 dated Nov. 7, 2018.

* cited by examiner

CERAMIC MATRIX COMPOSITE ARTICLES

FIELD

The present disclosure generally relates to ceramic matrix composites (CMC), and more particularly, to articles and methods for forming ceramic matrix composite articles.

BACKGROUND

Ceramic matrix composites generally include a ceramic fiber reinforcement material embedded in a ceramic matrix material. The reinforcement material serves as the load-bearing constituent of the CMC in the event of a matrix crack, while the ceramic matrix protects the reinforcement material, maintains the orientation of its fibers, and serves to dissipate loads to the reinforcement material. Of particular interest to high-temperature applications, such as in gas turbines, are silicon-based composites, which include silicon carbide (SiC) as the matrix and/or reinforcement material.

Different processing methods have been employed in forming CMCs. For example, one approach includes melt infiltration (MI), which employs a molten silicon to infiltrate into a fiber-containing perform. CMCs formed by prepreg MI are generally fully dense, e.g., having generally zero, or less than 3 percent by volume, residual porosity. This very low porosity gives the composite desirable mechanical properties, such as a high proportional limit strength and interlaminar tensile and shear strengths, high thermal conductivity and good oxidation resistance. However, the matrices of MI composites contain a free silicon phase (i.e., elemental silicon or silicon alloy) that limits the use temperature of the system to below that of the melting point of the silicon or silicon alloy, or about 2550 degrees Fahrenheit to 2570 degrees Fahrenheit. Moreover the free silicon phase causes the MI SiC matrix to have relatively poor creep resistance.

Another approach for forming CMCs is chemical vapor infiltration (CVI). CVI is a process whereby a matrix material is infiltrated into a fibrous preform by the use of reactive gases at elevated temperature to form the fiber-reinforced composite. Generally, limitations introduced by having reactants diffuse into the preform and by-product gases diffusing out of the perform result in relatively high residual porosity of between about 10 percent and about 15 percent in the composite. In particular, typically in forming CMCs using CVI, the inner portion of the composite formed by CVI typically has a higher porosity than the porosity of the outer portion of the composite. The presence of this porosity degrades the in-plane and through-thickness mechanical strength, thermal conductivity, and oxidation resistance of the CVI CMC relative to MI CMCs. However, CVI composite matrices typically have no free silicon phase, and thus have better creep resistance than MI matrices and the potential to operate at temperatures above 2570 degrees Fahrenheit.

However, there is a need for further ceramic matrix composites (CMC), and more particularly, to articles and methods for forming ceramic matrix composite articles.

BRIEF DESCRIPTION

Aspects and advantages of the invention will be set forth in part in the following description, or may be obvious from the description, or may be learned through practice of the invention.

In one exemplary embodiment of the present disclosure a ceramic matrix composite article is provided. The ceramic matrix composite article includes a chemical vapor infiltration ceramic matrix composite base portion including ceramic fiber reinforcement material in a ceramic matrix material having between 0% and 5% free silicon. The ceramic matrix composite article further includes a melt infiltration ceramic matrix composite covering portion including a ceramic fiber reinforcement material in a ceramic matrix material having a greater percentage of free silicon than the chemical vapor infiltration ceramic matrix composite base portion.

In certain exemplary embodiments the chemical vapor infiltration ceramic matrix composite base portion has substantially 0% free silicon.

In certain exemplary embodiments the melt infiltration ceramic matrix composite covering portion substantially completely surrounds at least a portion of the chemical vapor infiltration ceramic matrix composite base portion.

In certain exemplary embodiments the article is configured for use in a gas turbine engine.

For example, in certain exemplary embodiments the article is a nozzle, wherein the melt infiltration ceramic matrix composite covering portion includes a first melt infiltration ceramic matrix composite covering portion forming a radially inner band of the nozzle and a second melt infiltration ceramic matrix composite covering portion forming a radially outer band of the nozzle, and wherein the chemical vapor infiltration ceramic matrix composite base portion forms an airfoil section of the nozzle.

For example, in certain exemplary embodiments the article is a shroud, wherein the chemical vapor infiltration ceramic matrix composite base portion is exposed to a core air flowpath defined by the gas turbine engine when installed in the gas turbine engine.

For example, in certain exemplary embodiments the article is a liner, wherein the liner includes a hot side configured to be exposed to a core air flowpath defined by the gas turbine engine when installed in the gas turbine engine and an opposite cold side, and wherein the chemical vapor infiltration ceramic matrix composite base portion forms the hot side and the melt infiltration ceramic matrix composite covering portion forms the cold side.

For example, in certain exemplary embodiments the article is an airfoil, wherein the airfoil includes a first section and a separately formed second section, wherein each of the first section and the second section each include a chemical vapor infiltration ceramic matrix composite base portion and a melt infiltration ceramic matrix composite covering portion, and wherein the melt infiltration ceramic matrix composite covering portions of the first section and the second section are substantially completely enclosed within the chemical vapor infiltration ceramic matrix composite base portion when the first section and the second section of the airfoil are joined.

For example, in certain exemplary embodiments the chemical vapor infiltration ceramic matrix composite base portion is configured to be at least in part exposed to a core air flowpath defined by the gas turbine engine when installed in the gas turbine engine.

In certain exemplary embodiments the chemical vapor infiltration ceramic matrix composite base portion is formed separately from the melt infiltration ceramic matrix composite covering portion such that substantially all of a surface of the chemical vapor infiltration ceramic matrix composite base portion is exposed to one or more reactive gasses during formation.

For example, in certain exemplary embodiments the melt infiltration ceramic matrix composite covering portion is formed on the chemical vapor infiltration ceramic matrix composite base portion after the chemical vapor infiltration ceramic matrix composite base portion is formed.

In certain exemplary embodiments the chemical vapor infiltration ceramic matrix composite base portion defines a porosity between about five percent and about thirty percent, and wherein the melt infiltration ceramic matrix composite covering portion defines a porosity less than the porosity of the chemical vapor infiltration ceramic matrix composite base portion.

For example, in certain exemplary embodiments the melt infiltration ceramic matrix composite covering portion defines a porosity less than about three percent.

In an exemplary aspect of the present disclosure, a method for forming a ceramic matrix composite article is provided. The method includes forming a chemical vapor infiltration ceramic matrix composite base portion, wherein forming the chemical vapor infiltration ceramic matrix composite base portion includes exposing substantially all of a surface of the chemical vapor infiltration ceramic matrix composite base portion to one or more reactive gasses; and providing a melt infiltration ceramic matrix composite portion on a portion of the outer surface of the chemical vapor infiltration ceramic matrix composite base portion after forming the chemical vapor infiltration ceramic matrix composite base portion.

In certain exemplary aspects providing the melt infiltration ceramic matrix composite portion on the portion of the outer surface of the chemical vapor infiltration ceramic matrix composite base portion includes forming the melt infiltration ceramic matrix composite portion on the portion of the outer surface of the chemical vapor infiltration ceramic matrix composite base portion.

For example, in certain exemplary aspects forming the melt infiltration ceramic matrix composite covering portion on the chemical vapor infiltration ceramic matrix composite base portion includes laying up one or more layers of prepreg on the portion of the outer surface of the chemical vapor infiltration ceramic matrix composite base portion and performing a melt infiltration of the one or more layers of prepreg.

In certain exemplary aspects exposing substantially all of the surface of the chemical vapor infiltration ceramic matrix composite base portion to one or more reactive gasses includes forming ceramic fiber reinforcement material in a ceramic matrix material of the chemical vapor infiltration ceramic matrix composite base portion having between 0% and 5% free silicon, and wherein providing the melt infiltration ceramic matrix composite portion includes forming the melt infiltration ceramic matrix composite portion to include ceramic fiber reinforcement material in a ceramic matrix material having a greater percentage of free silicon than the chemical vapor infiltration ceramic matrix composite base portion.

In certain exemplary aspects the chemical vapor infiltration ceramic matrix composite base portion has substantially 0% free silicon.

In certain exemplary aspects the chemical vapor infiltration ceramic matrix composite base portion is configured to be at least in part exposed to a core air flowpath defined by the gas turbine engine when installed in the gas turbine engine.

In certain exemplary aspects providing the melt infiltration ceramic matrix composite portion on the portion of the outer surface of the chemical vapor infiltration ceramic matrix composite base portion includes affixing the melt infiltration ceramic matrix composite portion onto the portion of the outer surface of the chemical vapor infiltration ceramic matrix composite base portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
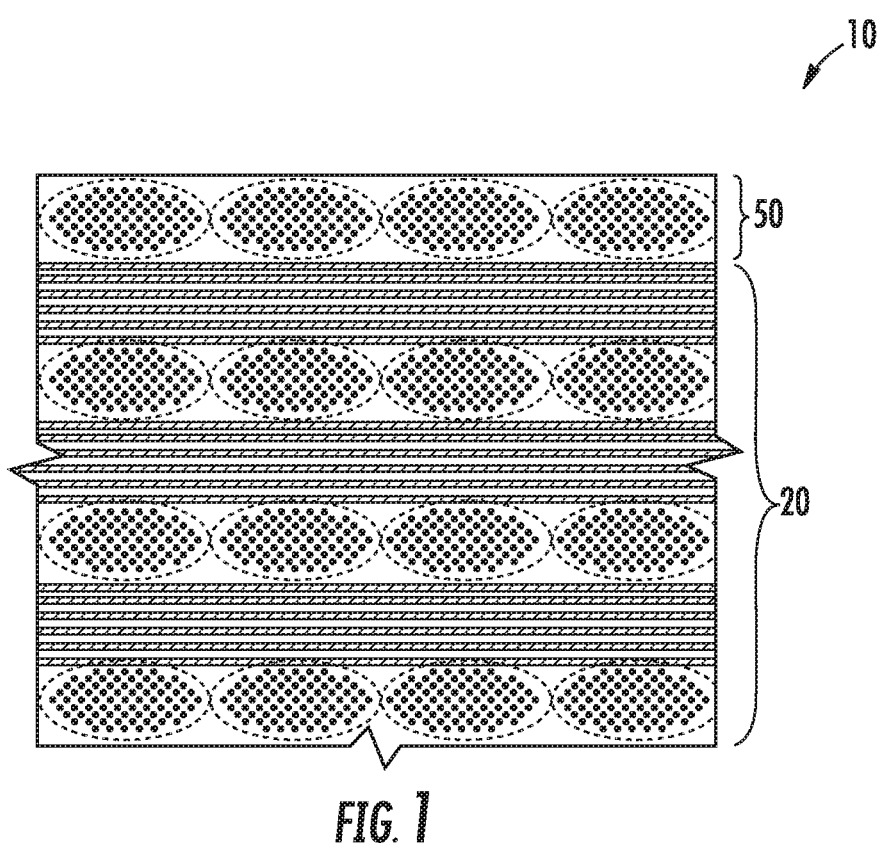
FIG. 1 is a cross-sectional view of a ceramic matrix composite article in accordance with aspects of the present disclosure having a ceramic matrix composite substrate and a ceramic matrix composite covering portion.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a ceramic matrix composite (CMC) articles having generally good mechanical properties such as tensile and compressive strength, and increased temperature capability. For example, a CMC article may include a CMC base portion and a CMC covering portion or layer. The CMC base portion and the CMC covering portion or layer may have different properties allowing tailoring of the CMC article to result in a CMC article having generally good mechanical properties with, e.g., increased creep resistance (resistance to deformation or change in shape over time due to stress), and increased temperature capability. The technique of the present disclosure results in both the CMC base portion and the CMC covering portion being CMCs having a reinforcing material, and thus both the CMC base portion and the CMC covering portion offering mechanical properties such as tensile and compressive strength. In addition, the CMC covering portion may also offer better mechanical properties and the CMC base portion may offer increased temperature capability to the CMC article. Such a technique of the present disclosure may be advantageous in CMC components where stresses are high and where creep is typically a problem, or where high temperatures are experienced. The CMC article may be configured such that the CMC base portion and the CMC surface portion more efficiently handle these obstacles. For example, forming the CMC covering portion using melt infiltration may result in a more fully dense CMC covering portion, which provides improved oxidation resistance to the overall laminate by reducing ingress of oxygen containing gasses to the underlying, and more porous, CMC base portion (which is formed using a chemical vapor infiltration). Such a CMC covering portion will also offer superior interlaminar strength (both interlaminar tensile strength and interlaminar shear strength). Further, forming the CMC base portion using chemical vapor infiltration results in a base portion having superior creep resistance and higher temperature capability.

Referring now to the drawings, wherein identical numerals indicate the same elements throughout the figures, FIG. 1 provides a CMC article 10 having a CMC base portion 20 and a CMC covering portion 50 in accordance with aspects of the present disclosure. As described in greater detail below, CMC base portion 20 may include a ceramic fiber reinforcement material in a ceramic matrix material including no free silicon content or proportion.

By contrast, CMC covering portion 50 may include a ceramic fiber reinforcement material in a ceramic matrix material having a free silicon content or proportion (e.g., the amount of elemental silicon or silicon alloy relative to the base portion as a whole). Herein the term free silicon refers to the presence of elemental silicon or silicon alloy where silicon makes up greater than about 33 atomic percent of the alloy. CMC covering portion 50 may be a silicon-rich silicon carbide portion having, for example, free silicon (e.g., at least about 5 percent, 10 percent, 15 percent, 20 percent, 30 percent, or greater free silicon by volume of elemental silicon or silicon alloy phase). CMC covering portion 50 may include a ceramic fiber reinforcement material in a ceramic matrix material disposed on a surface of at least a portion of the CMC base portion 20.

CMC covering portion 50 may have generally full density, or none or little porosity (e.g., about 0 percent, less than 5 percent, between about 0 and less than 5 percent). By contrast, CMC base portion 20 may contain silicon carbide with generally no or zero free silicon content, or slightly carbon rich silicon carbide. CMC covering portion 50 may be formed by a first process and CMC base portion 20 may be formed by a second process different from the first process. For example, the CMC covering portion 50 may be formed by using a melt infiltration process, and the CMC base portion 20 may be formed using a chemical vapor infiltration process. CMC covering portion 50 may have improved mechanical properties over base portion 20 and may result in CMC article 10 having an overall mechanical strength greater than an overall mechanical strength of a CMC article not having CMC covering portion 50. CMC base portion 20 which has no free elemental silicon or silicon alloy may withstand higher temperature (e.g., higher than the melting point of silicon) compared to CMC covering portion 50 (which may include free silicon) and may result in CMC article 10 that can withstand temperatures greater than that of a CMC article not having CMC base portion 20.

Figure 2:
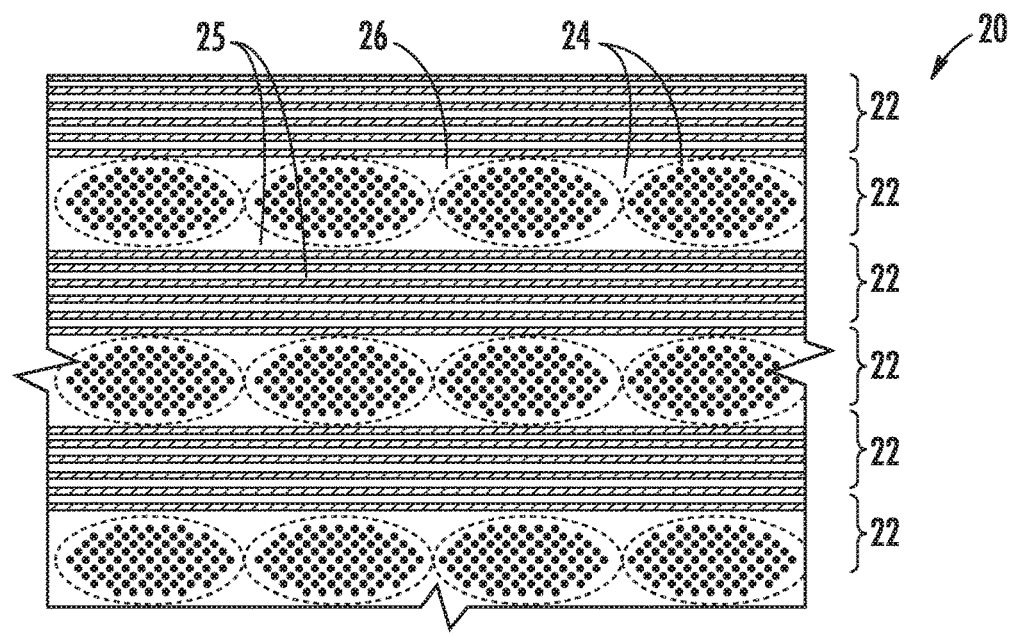
FIG. 2 cross-sectional view of the ceramic matrix composite substrate of the ceramic matrix composite article of FIG. 1.

With reference to FIG. 2, CMC article 10 (FIG. 1) may include initially forming CMC base portion 20. A surface region of CMC base portion 20 may include multiple laminae 22, each derived from an individual prepreg that includes unidirectionally-aligned tows 24 impregnated with a ceramic matrix precursor. As a result, each lamina 22 contains unidirectionally-aligned fibers 25 encased in a ceramic matrix 26 formed by conversion of the ceramic matrix precursor during firing and chemical vapor infiltration.

For example, CMC base portion 20 may be fabricated from multiple layers of "prepreg," often in the form of a tape-like structure, comprising the reinforcement material of the desired CMC impregnated with a precursor of the CMC matrix material. The prepreg may undergo processing (including firing) to convert the precursor to the desired ceramic. The prepregs may be continuous fiber reinforced ceramic composite (CFCC) materials and may include a two-dimensional fiber array comprising a single layer of unidirectionally-aligned tows impregnated with a matrix precursor to create a generally two-dimensional laminate. Multiple plies of the resulting prepregs are stacked and debulked to form a laminate preform, a process referred to as "lay-up." The prepregs are typically arranged so that tows of the prepreg layers are oriented transverse (e.g., perpendicular) or at an angle to each other, providing greater strength in the laminar plane of the preform (corresponding to the principal (load-bearing) directions of the final CMC component).

Following lay-up, the laminate preform may undergo debulking and curing while subjected to applied pressure and an elevated temperature, such as in an autoclave or localized application of pressure and heat. In the case of chemical vapor infiltration (CVI), the debulked and cured preform undergoes additional processing. First, the prepreg layers/preform may be heated in vacuum or in an inert atmosphere in order to decompose the organic binders, at least one of which pyrolyzes during this heat treatment to form a ceramic char, and produces a porous layer for chemical vapor infiltration. Further heating, either as part of the same heat cycle as the binder burn-out step or in an independent subsequent heating step, the layer is chemical vapor infiltrated, such as with a gaseous source of silicon carbide supplied externally. Appropriate reactant gases and processing conditions for performance of the CVI process are well known in the art. The gaseous source of silicon carbide infiltrates into the porosity, reacts on the internal surfaces of the porous base portion to deposit SiC with no free Si metal.

Notably, in at least certain exemplary embodiments, the CMC base portion 20 is completely formed first. More specifically, in at least certain exemplary embodiments, the CMC base portion 20 is laid up and taken through the chemical vapor infiltration process before adding the CMC covering portion 50. Such a process allows for substantially all of a surface of the base portion 20 to be exposed to the reactant gases during the chemical vapor infiltration process, resulting in a more quickly and completely formed base portion 20.

Figure 3:
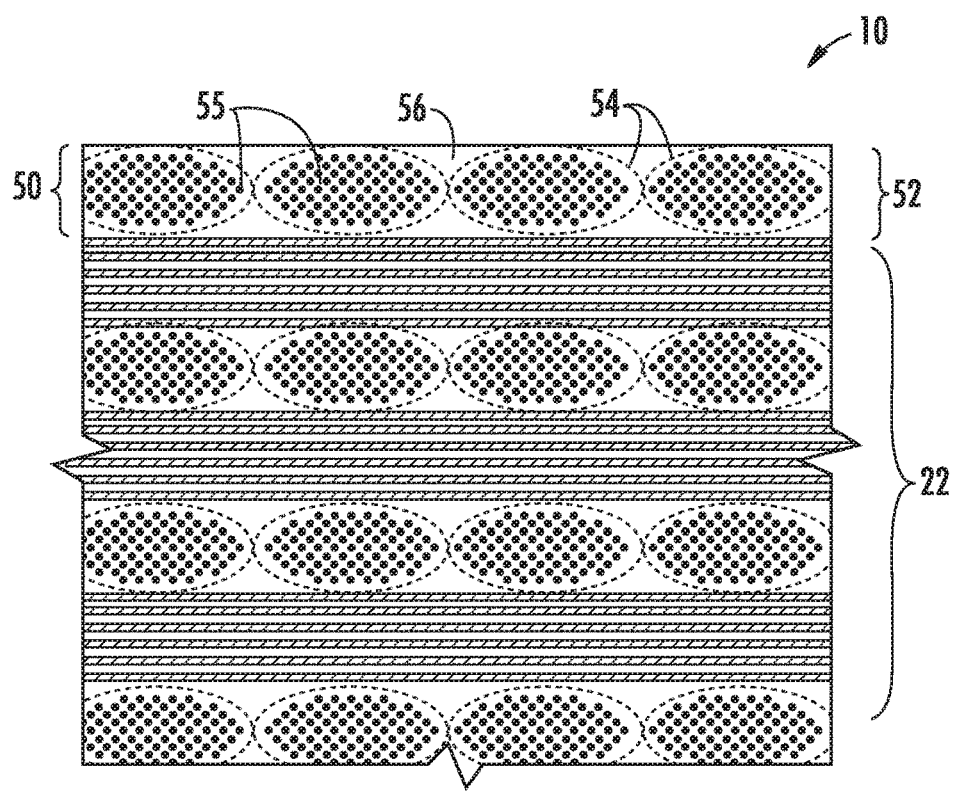
FIG. 3 is a cross-sectional view of the ceramic matrix composite substrate of FIG. 2 with the ceramic matrix composite covering portion.

With reference now to FIG. 3, forming the CMC article 10 may include forming the covering portion 50 on the initially formed CMC base portion 20. For example, a lamina 52 may be derived from an individual prepreg that includes unidirectionally-aligned tows 54 impregnated with a ceramic matrix precursor. Lamina 52 contains unidirectionally-aligned fibers 55 encased in a ceramic matrix 56 formed by conversion of the ceramic matrix precursor during firing and melt infiltration (MI).

For example, CMC covering portion 50 may be fabricated from a layer of "prepreg," often in the form of a sheet-like structure, comprising the reinforcement material of the desired CMC impregnated with a precursor of the CMC matrix material. The prepreg undergoes processing (including firing) to convert the precursor to the desired ceramic. The prepreg may be continuous fiber reinforced ceramic composite (CFCC) materials and may include a two-dimensional fiber array comprising a single layer of unidirectionally-aligned tows impregnated with a matrix precursor to create a generally two-dimensional laminate. Alternately the prepreg may comprise layers with woven fibers. A ply of the prepreg may be disposed on CMC base portion 20. The prepreg can be arranged so that tows of the prepreg layer are oriented parallel, transverse (e.g., perpendicular) or at an angle to the tows of the outermost layer of the CMC base portion.

Accordingly, it will be appreciated that for the exemplary embodiment depicted, the first layer of the covering portion 50 may be applied directly to a surface of the base portion 20. However, as the covering portion 50 may be processed using a melt infiltration process, in at least certain exemplary embodiments, the article 10 may further include a barrier layer between the base portion 20 and the first layer of the covering portion 50.

Referring still to FIG. 3, the prepreg layers/preform may undergo curing while subjected to applied pressure and an elevated temperature, such as in an autoclave or localized application of pressure and heat. In the case of melt-infiltrated (MI), the cured preform undergoes additional processing. First, the preform may be heated in vacuum or in an inert atmosphere in order to decompose the organic binders, at least one of which pyrolyzes during this heat treatment to form a carbon char, and produces a porous preform for melt infiltration. Further heating, either as part of the same heat cycle as the binder burn-out step or in an independent subsequent heating step, the preform is melt infiltrated, such as with molten silicon supplied externally. The molten silicon infiltrates into the porosity, reacts with the carbon constituent of the matrix to form silicon carbide, and fills the porosity to yield the desired CMC covering portion 50.

Notably, for the embodiment of FIG. 3, the covering portion 50 is depicted including a single layer of CMC processed/formed using melt infiltration. It should be appreciated, however, that in other exemplary embodiments, the covering portion 50 may instead include any suitable number of layers of CMC processed/formed using melt infiltration to result in a CMC article 10 having a desire geometry.

Figure 4:
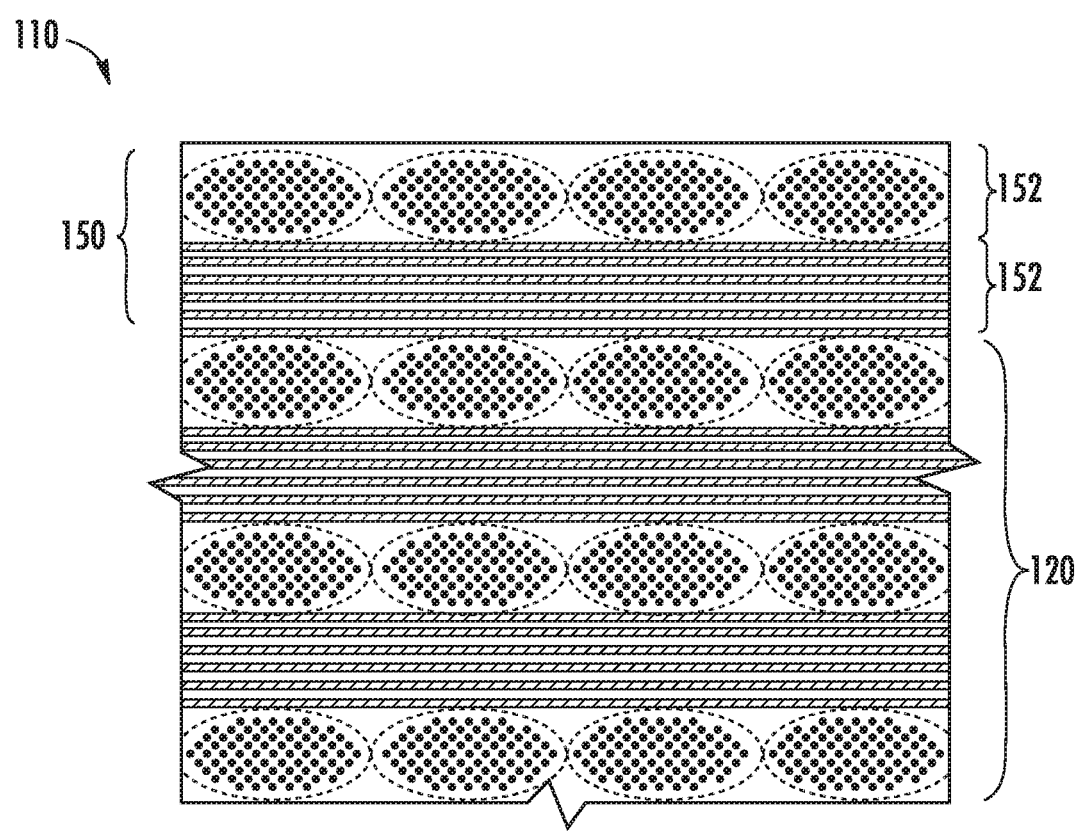
FIG. 4 is a cross-sectional view of a CMC article in accordance with aspects of the present disclosure having a ceramic matrix composite substrate and a ceramic matrix composite covering portion.

For example, FIG. 4 illustrates a CMC article 110 having a CMC base portion 120 and a CMC covering portion 150 in accordance with another aspect of the present disclosure. CMC base portion 120 may include essentially no free silicon proportion or content, and CMC covering portion 150 may include a ceramic fiber reinforcement material in a ceramic matrix material including a free silicon proportion or content and disposed on a surface of at least a portion of the CMC base portion 120.

More specifically, for the embodiment depicted the CMC covering portion 150 may have generally full density, or none or little porosity (e.g., about 0 percent, less than 5 percent, or between about 0 and less than 5 percent). CMC covering portion 150 may be a silicon-rich silicon carbide covering portion having, for example, free silicon (e.g., at least about 5 percent, 10 percent, 15 percent, 20 percent, 30 percent, or greater free silicon by volume of elemental silicon or silicon alloy phase). By contrast, CMC base portion 120 may be generally pure silicon carbide, generally silicon carbide with no or zero free silicon content, or slightly carbon rich silicon carbide. CMC covering portion 150 may be formed by a first process and CMC base portion 120 may be formed by a second process different from the first process. For example, the CMC covering portion 150 may be formed using a melt infiltration process, and the CMC base portion 120 may be formed using a chemical vapor infiltration process. CMC covering portion 150 may therefore have an increased mechanical strength as compared to the CMC base portion 120, which may result in CMC article 110 having an overall mechanical strength greater than an overall mechanical strength of a CMC article not having covering portion 150. CMC base portion 120 which may have no free elemental silicon or silicon alloy may withstand higher temperatures (e.g., higher than the melting point of silicon) compared to CMC covering portion 150 (which may include free silicon) and may result in CMC article 110 that can withstand higher temperatures than that of a CMC article not having CMC base portion 120.

CMC article 110 may include initially forming CMC base portion 120 in a similar manner as noted above in connection with forming base portion 20 (FIG. 2). With reference still to FIG. 4, CMC article 110 may include forming covering portion 150 on initially formed CMC base portion 120. For example, covering portion 150 may include a plurality of laminae 152, each derived from an individual prepreg that includes unidirectionally-aligned tows impregnated with a ceramic matrix precursor. Each lamina 152 may contain unidirectionally-aligned fibers or woven fibers encased in a ceramic matrix formed by conversion of the ceramic matrix precursor during firing and melt infiltration (MI).

For example, similar to the embodiments discussed above, CMC covering portion 150 may be fabricated from a plurality of layers of "prepreg," often in the form of a tape-like structure, comprising the reinforcement material of the desired CMC impregnated with a precursor of the CMC matrix material. The prepreg undergoes processing (including firing) to convert the precursor to the desired ceramic. The prepregs may be continuous fiber reinforced ceramic composite (CFCC) materials and may include a two-dimensional fiber array comprising a single layer of unidirectionally-aligned tows impregnated with a matrix precursor to create a generally two-dimensional laminate. Alternately the prepreg may comprise layers with woven fibers. The plurality of plies of the resulting prepregs are stacked and debulked. The prepregs are typically arranged so that tows of the prepreg layers are oriented parallel to, transverse (e.g., perpendicular) to or at an angle to the tows of the outermost layer of the CMC base portion.

The plurality of layers may typically undergo debulking and curing while subjected to applied pressure and an elevated temperature, such as in an autoclave or localized application of pressure and heat. In the case of infiltration (MI), the cured preform undergoes additional processing. First, the plurality of layers disposed on the CMC base portion may be heated in vacuum or in an inert atmosphere in order to decompose the organic binders, at least one of which pyrolyzes during this heat treatment to form a carbon char, and produces a porous preform for melt infiltration. Further heating, either as part of the same heat cycle as the binder burn-out step or in an independent subsequent heating step, the preform is melt infiltrated, such as with molten silicon supplied externally. The molten silicon infiltrates into the porosity, reacts with the carbon constituent of the matrix to form silicon carbide, and fills the porosity to yield the desired CMC covering portion 150.

An alternate embodiment would be to place the CVI composite base portion into a mold with a layer, or layers, of fiber plies occupying the space between the outer surface of the CVI composite base portion and inner surface of the mold, and the structure subjected to MI. The mold material would be compatible with the MI process.

In the above embodiments, a material for the tows may be SiC fibers. An example of a material suitable for the tows is HI-NICALON® from Nippon Carbon Co., Ltd. A suitable range for the diameters of the fibers is about two to about twenty micrometers, though fibers with larger and smaller diameters are also within the scope of this disclosure. The fibers may be preferably coated with materials to impart certain desired properties to the CMC base portion and/or CMC covering portion, such as a carbon or boron nitride interface layer (not shown). The fibers in the covering portion may be coated prior to forming into the prepreg tapes and application to the CVI CMC base portion, or the fiber coatings may be applied during the initial part of the MI process. Those skilled in the art will appreciate that the teachings of this disclosure are also applicable to other CMC material combinations, and that such combinations are within the scope of this disclosure.

As described above, the CMC base portion formed by a CVI process having generally no free silicon phase may result in the CMC base portion having greater creep resistance and temperature capability than the CMC covering portion formed by MI and having generally full density, or none or little porosity such as about 0 percent, less than 5 percent, or between about 0 and less than 5 percent. In addition, the CMC covering portion such as formed by a silicon melt infiltration may result in a silicon-rich silicon carbide covering portion having, for example, 5 percent, 10 percent, 15 percent, 20 percent, 30 percent, or greater free silicon by volume of elemental silicon or silicon alloy phase. The CMC base portion may comprise generally pure silicon carbide, e.g., about 1 to 1 ratio of silicon to carbon, or slightly carbon rich such as a ratio of 0.995 silicon to 1.005 carbon. The thickness of the plies or unidirectional tape for forming the CMC article may be about 3 mils (0.003 inch) to about 20 mils (0.020 inch). The CMC article may be formed having a single ply or layer of reinforcement fibers, a plurality of plies or layers of reinforcement fibers, or multiple plies or layers of reinforcement fibers for forming the CMC covering portion. For example, the CMC article of the present disclosure may comprise a CMC base portion formed from about eight plies or layers of reinforcement fibers and CVI, and an covering portion formed from one or two plies or layers of reinforcement fibers and melt infiltration so that the covering portion may be about 10 percent to about 25 percent of the thickness of the CMC article. In other embodiments of the ceramic matrix composite article, the covering portion may be about 5 percent to about 70 percent of the thickness of the ceramic matrix composite article. In other embodiments, the CMC article may have about 50 to about 100 plies. It will be appreciated that other configurations of the number of plies and thickness of the CMC base portion relative to the CMC covering portion are also possible.

While the CMC article may be formed from unidirectional prepreg tapes, it will be appreciated that woven prepreg tape may be employed to form the CMC base portion and/or the CMC covering portion. The aligned fibers in the unidirectional prepreg tape may result in fewer pores than that resulting from a prepreg woven fiber fabric. In addition, one or more additional layers or coatings may be formed on the CMC covering portion of the CMC article. For example, in some embodiments, an environmental barrier coating (EBC) may be formed on the covering portion.

It will be appreciated that one or more the exemplary CMC articles described above with reference to FIGS. 1 through 4 may be configured for use in a gas turbine engine. For example, in certain exemplary embodiments of the present disclosure, the CMC article may be configured for use within an aeronautical gas turbine engine (such as a turbofan engine, turboprop engine, turboshaft engine, turbojet engine, etc.), a power generation gas turbine engine, or an aeroderivative gas turbine engine. However, in other embodiments, the CMC articles of the present disclosure may be utilized with any other suitable machine.

Figure 5:
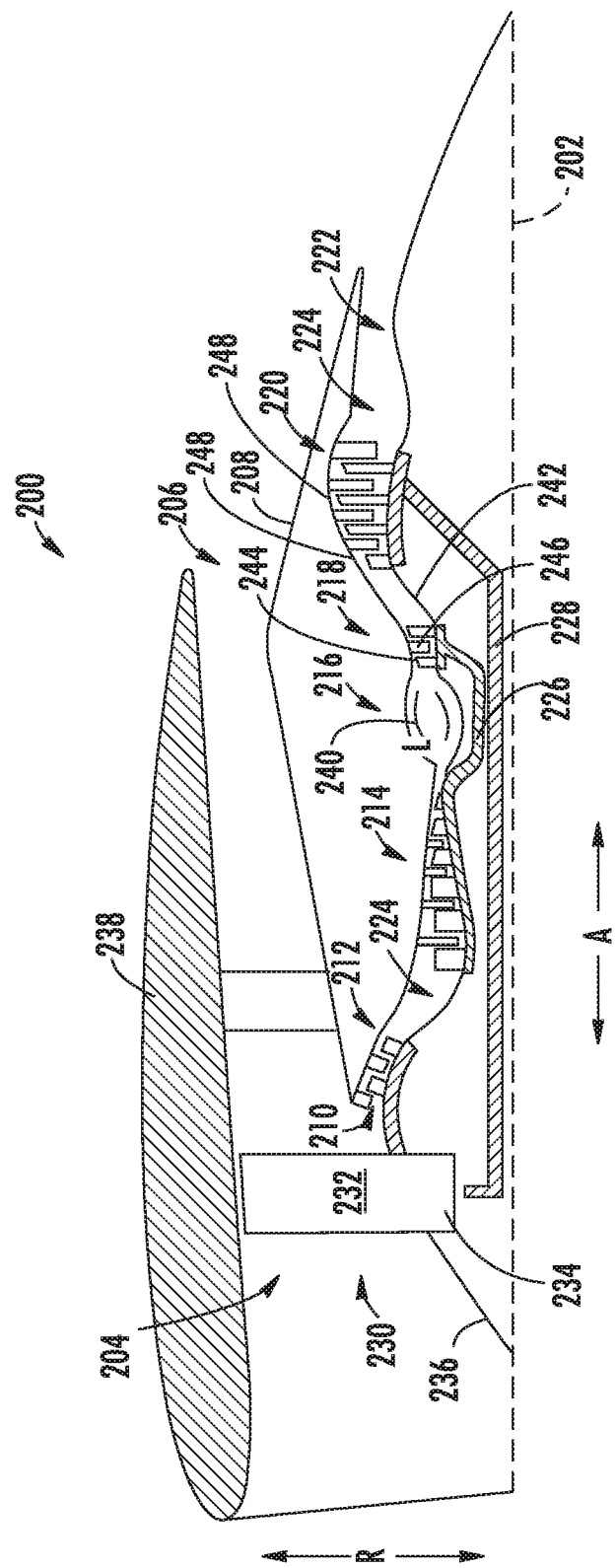
FIG. 5 is a schematic, cross-sectional view of a gas turbine engine in accordance with an exemplary embodiment of the present disclosure.

For example, referring briefly to FIG. 5, a simplified, schematic view is provided of a gas turbine engine 200 which may include a CMC article formed in accordance with one or more exemplary aspects of the present disclosure. It will be appreciated, however, that the exemplary gas turbine engine 200 described with reference to FIG. 5 is by way of example only, and in other embodiments the gas turbine engine may have any suitable configuration. The exemplary gas turbine engine 200 defines an axial direction A (extending parallel to a longitudinal centerline 202 provided for reference), and a radial direction R. In general, the gas turbine engine 200 includes a fan section 204 and a turbomachine 206 disposed downstream from the fan section 204. The exemplary turbomachine 206 depicted generally includes a substantially tubular outer casing 208 that defines an annular inlet 210. The outer casing 208 encases, in serial flow relationship, a compressor section including a booster or low pressure (LP) compressor 212 and a high pressure (HP) compressor 214; a combustion section 216; a turbine section including a high pressure (HP) turbine 218 and a low pressure (LP) turbine 220; and a jet exhaust nozzle section 222. The compressor section, combustion section 216, and turbine section together define a core air flowpath 224. A first, high pressure (HP) shaft or spool 226 drivingly connects the HP turbine 218 to the HP compressor 214. A second, low pressure (LP) shaft or spool 228 drivingly connects the LP turbine 220 to the LP compressor 212.

For the embodiment depicted, the fan section 204 includes a fan 230 having a plurality of fan blades 232 coupled to a disk 234 in a spaced apart manner. The disk 234 is covered by rotatable front hub 236 aerodynamically contoured to promote an airflow through the plurality of fan blades 232. Additionally, the exemplary fan section 204 includes an annular fan casing or outer nacelle 238 that circumferentially surrounds the fan 230 and/or at least a portion of the turbomachine 206. As is depicted, the fan blades 232, disk 234, and front hub 236 are together rotatable about the longitudinal axis 202 directly by the LP spool 228.

It will be appreciated that during operation of the gas turbine engine 200, certain components may be exposed relatively high temperatures, and therefore it may be beneficial to form one or more of such components of a CMC material. For example, within the combustion section 216, a combustor is provided having combustor liners 240, and more specifically, an inner combustor liner in an outer combustor liner. Additionally, within the turbine section of the turbomachine 204, the turbomachine 204 includes one or more liners 242 defining a portion of the core air flowpath 224 therethrough. Although depicted between the HP turbine 218 and LP turbine 220, in other embodiments the liner(s) 242 may be located at any other suitable location along the core air flowpath 224. Also, the HP turbine 218 and LP turbine 220 each include a plurality of turbine airfoils, which may be configured as part of rotor blades 244 coupled to the HP spool 226 or the LP spool 228, or as part of stator vanes 246 coupled to casing 208. Moreover, within the HP turbine 218 and LP turbine 220, the turbomachine 206 further includes one or more shrouds 248 positioned at radially outer ends of the plurality of rotor blades 244 to form a seal with such rotor blades 244. As will be discussed below, one or more of these components, as well as one or more other components, may be formed in a manner similar to the CMC articles discussed above with reference to FIGS. 1 through 4.

More specifically, for example, referring now generally to FIGS. 6 through 10, various ceramic matrix composite articles 250 in accordance with certain embodiments of the present disclosure are provided, e.g., as may be incorporated into the exemplary gas turbine engine of FIG. 5. Each of the ceramic matrix composite articles 250 depicted in FIGS. 6 through 10 include a CVI ceramic matrix composite base portion 252 and an MI ceramic matrix composite covering portion 254. The MI ceramic matrix composite covering portions 254 of each of the respective ceramic matrix composite articles 250 are attached to, or formed on, the CVI ceramic matrix composite base portion 252.

Figure 6:
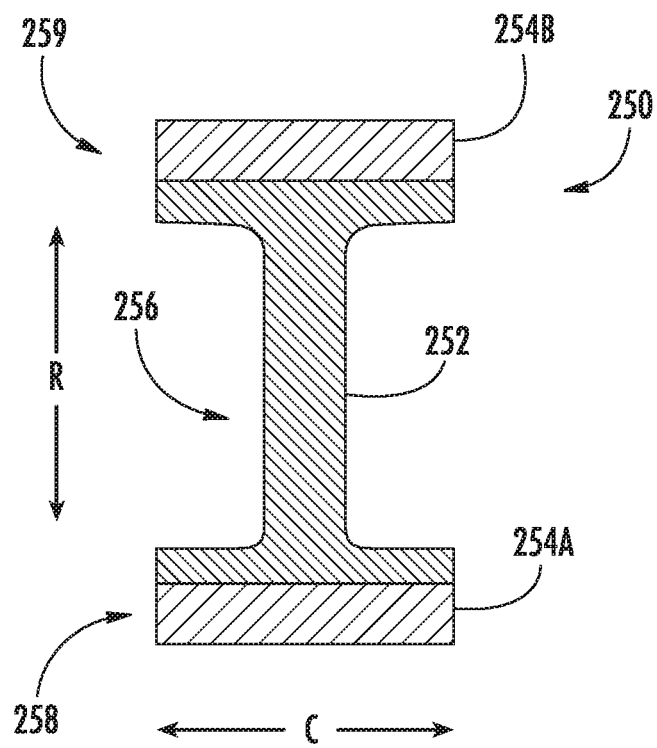
FIG. 6 is a cross-sectional view of a CMC article as may be incorporated into the gas turbine engine of FIG. 5 in accordance with an exemplary aspect of the present disclosure.

For example, referring particularly to FIG. 6, a side, cross-sectional view is provided of a CMC article 250 in accordance with an embodiment of the present disclosure as may be incorporated in a gas turbine engine, such as the exemplary gas turbine 200 engine of FIG. 5. More specifically, for the embodiment depicted, the article 250 is configured as a nozzle generally including an airfoil section 256, a radially inner band 258, and a radially outer band 259. The CVI base portion 252 for the embodiment depicted substantially completely forms the airflow section 256. Moreover, the CMC article 250 includes a first MI covering portion 254A and a second MI covering portion 254B. The first MI covering portion 254A forms the inner band 258, and the second MI covering portion 254B forms the outer band 259. Accordingly, the CVI base portion 252 may be formed first, and the MI covering portions 254A, 254B may be subsequently formed around, or on, at least a portion of the previously formed CVI base portion 252.

Notably, it will be appreciated that the gas turbine engine into which the nozzle is incorporated will define a core air flowpath (e.g., a flowpath through a compressor section, combustion section, and turbine section). When incorporated into such a gas turbine engine, at least a portion of the CVI base portion 252 of the nozzle 250 will be exposed to the core air flowpath. More particularly, substantially all of the airfoil section 256 of the nozzle will be exposed to the core air flowpath, and given the greater temperature resistance of the CVI base portion 252, as compared to the MI covering portions 254A, 254B, the resulting nozzle may be capable of withstanding higher temperatures within the gas turbine engine. By contrast, the MI covering portions 254A, 254B will not be as exposed to the core air flowpath, but will be tasked with supporting the CVI base portion 252, and given the improved mechanical properties as compared to the CVI base portion 252, the resulting nozzle may be better capable of handling the forces. It will be appreciated, that as used herein, a portion of a component being "exposed to the core air flowpath" refers to such portion of the component generally being exposed to the environment of the core air flowpath, and is meant to include a portion of the component having one or more of a bond coating, environmental barrier coating, or the like applied to a surface thereof. Accordingly, if an airfoil section includes a bond coating and/or an environmental barrier coating it is still "exposed to the core air flowpath."

Figure 7:
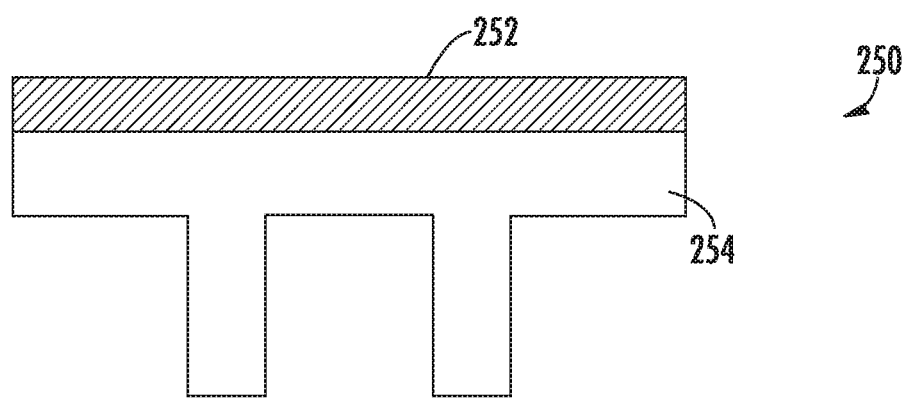
FIG. 7 is a cross-sectional view of a CMC article as may be incorporated into the gas turbine engine of FIG. 5 in accordance with another exemplary aspect of the present disclosure.

Referring now to FIG. 7, another embodiment of a ceramic matrix composite article 250 in accordance with an exemplary embodiment of the present disclosure is provided. More particularly, FIG. 7 depicted a shroud as may be incorporated into a gas turbine engine, such as the exemplary gas turbine 200 engine of FIG. 5. For example, the shroud may be positioned within a turbine section of the gas turbine engine. The shroud generally includes a CVI base portion 252 and an MI covering portion 254. The CVI base portion 252 may be exposed to a core air flowpath of the gas turbine engine when installed in the gas turbine engine. Accordingly, the CVI base portion 252 may form a hot side of the shroud, while the MI covering portion 254 may form an opposite, cold side of the shroud. Such a configuration may allow for the shroud to withstand higher temperatures from within the gas turbine engine.

Figure 8:
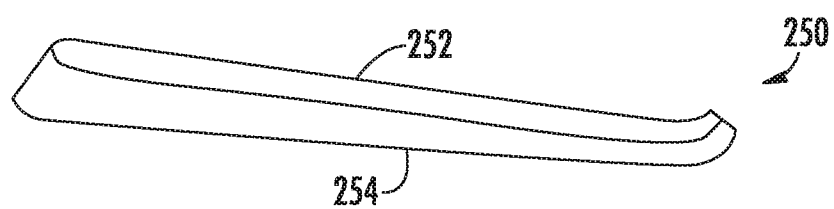
FIG. 8 is a cross-sectional view of a CMC article as may be incorporated into the gas turbine engine of FIG. 5 in accordance with yet another exemplary aspect of the present disclosure.

Similarly, referring now to FIG. 8, yet another embodiment of a ceramic matrix composite article 250 in accordance with an exemplary embodiment of the present disclosure is provided. Specifically, FIG. 8 depicts a liner as may be incorporated into a gas turbine engine, such as the exemplary gas turbine engine 200 of FIG. 5. For example, the liner may be configured as a liner within a turbine section of the gas turbine engine, a liner of a combustor within a combustion section of the gas turbine engine, etc. The liner generally includes a CVI base portion 252 and an MI covering portion 254. The CVI base portion 252 may be exposed to a core air flowpath within the gas turbine engine when installed in the gas turbine engine. Accordingly, the CVI base portion 252 may form a hot side of the liner, while the MI covering portion 254 may form an opposite, cold side of the liner. Such a configuration may allow for the liner to withstand higher temperatures from within the gas turbine engine.

Figure 9:
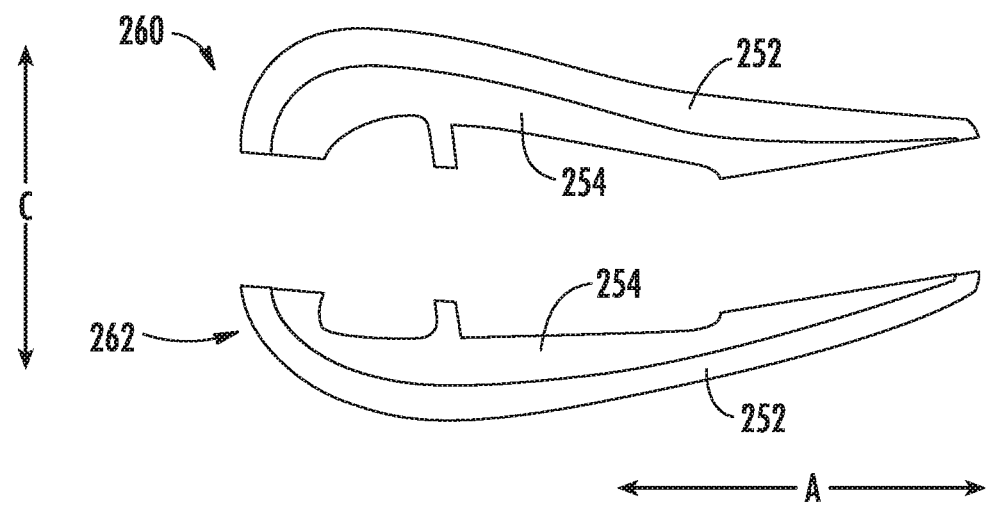
FIG. 9 is a cross-sectional view of a CMC article as may be incorporated into the gas turbine engine of FIG. 5 in accordance with still another exemplary aspect of the present disclosure, with a first section being separated from a second section.
Figure 10:
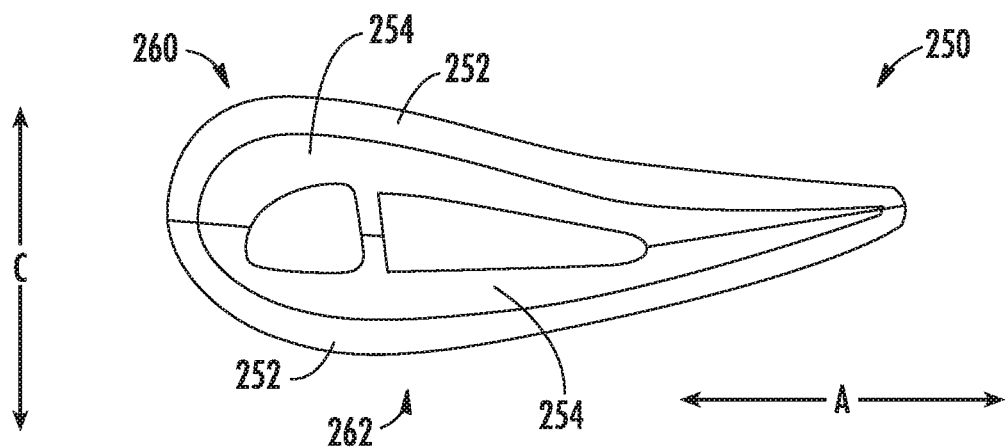
FIG. 10 is a cross-sectional view of the exemplary CMC article of FIG. 9 with the first section being coupled to the second section.

Moreover, referring now to FIGS. 9 and 10, still another exemplary embodiment of the ceramic matrix composite article 250 in accordance with an exemplary embodiment of the present disclosure is provided. Particularly, FIGS. 9 and 10 depict an airfoil as may be incorporated into a gas turbine engine, such as the exemplary gas turbine engine 200 of FIG. 5. By contrast with the airfoil section 256 of the nozzle described above with reference to FIG. 6, the exemplary airfoil of FIGS. 9 and 10 is formed of at least two parts. More specifically, for the embodiment depicted, the airfoil is formed of a first section 260 and a second section 262, the first section 260 and second section 262 being joined together to form the airfoil. FIG. 9 shows the first section 260 being separated from the second section 262 (i.e., after the first and second sections 260, 262 have been formed, but before the first and second sections 260, 262 have been joined together), and FIG. 10 shows the first and second sections 260, 262 joined together to form the airfoil.

Each of the first section 260 and second section 262 include a CVI ceramic matrix composite base portion 252 and an MI ceramic matrix composite covering portion 254. Notably, when the first section 260 and the second section 262 are joined together, the MI ceramic matrix composite covering portions 254 are substantially completely enclosed within the CVI ceramic matrix composite base portions 252. Accordingly, once fully assembled and installed within a gas turbine engine, the MI ceramic matrix composite covering portions 254 are not exposed to a core air flowpath of the gas turbine engine, and instead, only the CVI ceramic matrix composite base portions 252 of the first section 260 and second section 262 are exposed to the core air flowpath of the gas turbine engine. Such a configuration may allow for the airfoil to withstand higher temperatures from within the gas turbine engine. It will be appreciated that although for the embodiment depicted the airfoil includes a first section 260 and a second section 262, in other exemplary embodiments the airfoil may be formed of any other suitable number of distinct sections. Additionally, it will be appreciated that distinct sections of the airfoil may be joined together using any suitable method.

With each of the embodiments of the ceramic matrix composite article 250 described above with reference to FIGS. 6 through 10, it will be appreciated that the CVI ceramic matrix composite base portion 252 may be formed first, with the MI ceramic matrix composite covering portion 254 formed thereafter on the CVI ceramic matrix composite base portion 252. Such may allow for the CVI ceramic matrix composite base portion 252 to be formed more completely and with a reduced porosity, as substantially all of a surface of the CVI ceramic matrix composite base portion 252 may be exposed to the one or more reactive gases used to form the CVI ceramic matrix composite base portion 252. By reducing the porosity of the CVI ceramic matrix composite base portion 252 in such a manner, the CVI ceramic matrix composite base portion 252 may exhibit improved properties.

Figure 11:
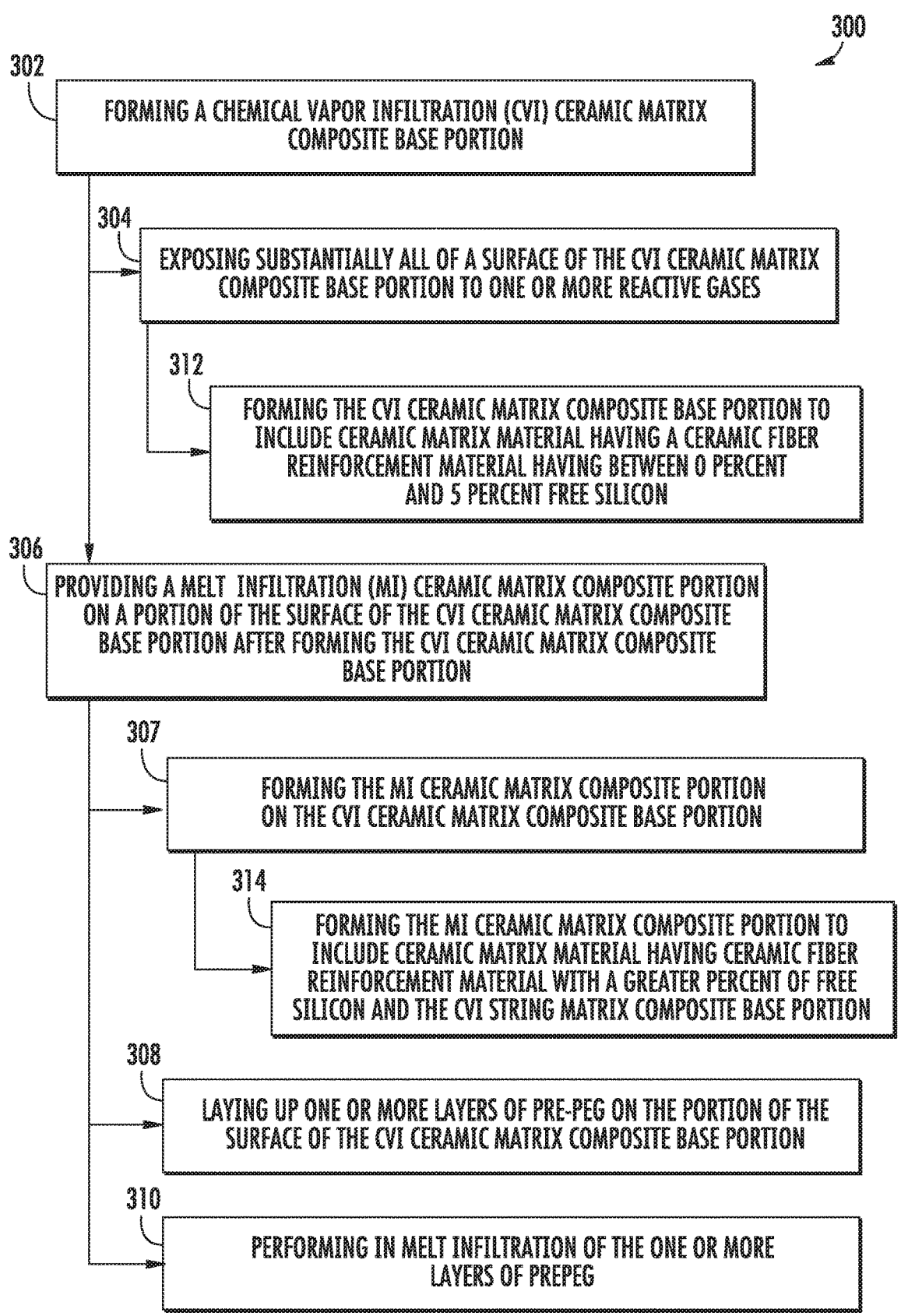
FIG. 11 is a flow diagram of a method for forming a CMC article in accordance with an exemplary aspect of the present disclosure.

Referring now to FIG. 11, a method 300 for forming a ceramic matrix composite article in accordance with an exemplary aspect of the present disclosure is provided. The exemplary method 300 may be utilized to form one or more of the exemplary CMC articles described above with reference to FIGS. 1 through 10.

As is depicted, the exemplary method 300 of FIG. 11 includes at (302) forming a chemical vapor infiltration (CVI) ceramic matrix composite base portion. Forming the CVI ceramic matrix composite base portion at (302) includes at (304) exposing substantially all of a surface of the CVI ceramic matrix composite base portion to one or more reactive gases. The surface of the CVI CMC base portion may refer to an entirety of the surface of the CVI CMC base portion.

Moreover, the exemplary method 300 of FIG. 11 includes at (306) providing a melt infiltration (MI) ceramic matrix composite portion on a portion of the surface of the CVI ceramic matrix composite base portion after forming the CVI ceramic matrix composite base portion at (302). For example, for the exemplary aspect of the method 300 depicted, providing the MI ceramic matrix composite portion on the CVI ceramic matrix composite base portion at (306) includes at (307) forming the MI ceramic matrix composite portion on the CVI ceramic matrix composite base portion. Further, forming the MI ceramic matrix composite portion on the CVI ceramic matrix composite base portion at (307) includes at (308) laying up one or more layers of pre-peg on the portion of the surface of the CVI ceramic matrix composite base portion and at (310) performing a melt infiltration of the one or more layers of prepreg.

Notably, in certain exemplary aspects, exposing substantially all of the outer surface of the CVI ceramic matrix composite base portion to one or more reactive gases at (304) includes at (312) forming the CVI ceramic matrix composite base portion to include ceramic matrix material having a ceramic fiber reinforcement material having between 0 percent and 5 percent free silicon. Additionally, forming the MI ceramic matrix composite portion at (307) further includes at (314) forming the MI ceramic matrix composite portion to include ceramic matrix material having ceramic fiber reinforcement material with a greater percent of free silicon and the CVI string matrix composite base portion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A ceramic matrix composite article comprising:
 a chemical vapor infiltration ceramic matrix composite base portion comprising ceramic fiber reinforcement material in a ceramic matrix material having between 0% and 5% free silicon; and a melt infiltration ceramic matrix composite covering portion comprising a ceramic fiber reinforcement material in a ceramic matrix material having a greater percentage of free silicon than the chemical vapor infiltration ceramic matrix composite base portion, wherein the melt infiltration ceramic matrix composite covering portion surrounds at least a portion of the chemical vapor infiltration ceramic matrix composite base portion.

2. The ceramic matrix composite article of claim 1, wherein the chemical vapor infiltration ceramic matrix composite base portion has substantially 0% free silicon.

3. The ceramic matrix composite article of claim 1, wherein the melt infiltration ceramic matrix composite covering portion completely surrounds the chemical vapor infiltration ceramic matrix composite base portion.

4. The ceramic matrix composite article of claim 1, wherein the article is configured for use in a gas turbine engine.

5. The ceramic matrix composite article of claim 4, wherein the article is a nozzle, wherein the melt infiltration ceramic matrix composite covering portion includes a first melt infiltration ceramic matrix composite covering portion forming a radially inner band of the nozzle and a second melt infiltration ceramic matrix composite covering portion forming a radially outer band of the nozzle, and wherein the chemical vapor infiltration ceramic matrix composite base portion forms an airfoil section of the nozzle.

6. The ceramic matrix composite article of claim 4, wherein the article is a shroud, wherein the chemical vapor infiltration ceramic matrix composite base portion is exposed to a core air flowpath defined by the gas turbine engine when installed in the gas turbine engine.

7. The ceramic matrix composite article of claim 4, wherein the article is a liner, wherein the liner comprises a hot side configured to be exposed to a core air flowpath defined by the gas turbine engine when installed in the gas turbine engine and an opposite cold side, and wherein the chemical vapor infiltration ceramic matrix composite base portion forms the hot side and the melt infiltration ceramic matrix composite covering portion forms the cold side.

8. The ceramic matrix composite article of claim 4, wherein the article is an airfoil, wherein the airfoil comprises a first section and a separately formed second section, wherein each of the first section and the second section each include a chemical vapor infiltration ceramic matrix composite base portion and a melt infiltration ceramic matrix composite covering portion, and wherein the melt infiltration ceramic matrix composite covering portions of the first section and the second section are substantially completely enclosed within the chemical vapor infiltration ceramic matrix composite base portion when the first section and the second section of the airfoil are joined.

9. The ceramic matrix composite article of claim 4, wherein the chemical vapor infiltration ceramic matrix composite base portion is configured to be at least in part exposed to a core air flowpath defined by the gas turbine engine when installed in the gas turbine engine.

10. The ceramic matrix composite article of claim 1, wherein the chemical vapor infiltration ceramic matrix composite base portion is formed separately from the melt infiltration ceramic matrix composite covering portion such that substantially all of a surface of the chemical vapor infiltration ceramic matrix composite base portion is exposed to one or more reactive gasses during formation.

11. The ceramic matrix composite article of claim 10, wherein the melt infiltration ceramic matrix composite covering portion is formed on the chemical vapor infiltration ceramic matrix composite base portion after the chemical vapor infiltration ceramic matrix composite base portion is formed.

12. The ceramic matrix composite article of claim 1, wherein the chemical vapor infiltration ceramic matrix composite base portion defines a porosity between about five percent and about thirty percent, and wherein the melt infiltration ceramic matrix composite covering portion defines a porosity less than the porosity of the chemical vapor infiltration ceramic matrix composite base portion.

13. The ceramic matrix composite article of claim 12, wherein the melt infiltration ceramic matrix composite covering portion defines a porosity less than about three percent.

14. A method for forming a ceramic matrix composite article comprising:

forming a chemical vapor infiltration ceramic matrix composite base portion having between 0 vol % and 5 vol % free silicon, wherein forming the chemical vapor infiltration ceramic matrix composite base portion comprises exposing substantially all of a surface of the chemical vapor infiltration ceramic matrix composite base portion to one or more reactive gasses; and providing a melt infiltration ceramic matrix composite covering portion on a portion of the outer surface of the chemical vapor infiltration ceramic matrix composite base portion after forming the chemical vapor infiltration ceramic matrix composite base portion, wherein the melt infiltration ceramic matrix composite covering portion has a greater volume percentage of free silicon than the chemical vapor infiltration ceramic matrix composite base portion, wherein the melt infiltration ceramic matrix composite covering portion surrounds at least a portion of the chemical vapor infiltration ceramic matrix composite base portion.

15. The method of claim 14, wherein providing the melt infiltration ceramic matrix composite covering portion on the portion of the outer surface of the chemical vapor infiltration ceramic matrix composite base portion comprises forming the melt infiltration ceramic matrix composite covering portion on the portion of the outer surface of the chemical vapor infiltration ceramic matrix composite base portion.

16. The method of claim 15, wherein forming the melt infiltration ceramic matrix composite covering portion on the chemical vapor infiltration ceramic matrix composite base portion comprises laying up one or more layers of prepreg on the portion of the outer surface of the chemical vapor infiltration ceramic matrix composite base portion and performing a melt infiltration of the one or more layers of prepreg.

17. The method of claim 14, wherein exposing substantially all of the surface of the chemical vapor infiltration ceramic matrix composite base portion to one or more reactive gasses comprises forming ceramic fiber reinforcement material in a ceramic matrix material of the chemical vapor infiltration ceramic matrix composite base portion, and wherein providing the melt infiltration ceramic matrix composite covering portion comprises forming the melt infiltration ceramic matrix composite covering portion to include ceramic fiber reinforcement material in a ceramic matrix material.

18. The method of claim 14, wherein the chemical vapor infiltration ceramic matrix composite base portion has substantially 0% free silicon.

19. The method of claim 14, wherein the chemical vapor infiltration ceramic matrix composite base portion is configured to be at least in part exposed to a core air flowpath defined by the gas turbine engine when installed in the gas turbine engine.

20. The method of claim 14, wherein providing the melt infiltration ceramic matrix composite covering portion on the portion of the outer surface of the chemical vapor infiltration ceramic matrix composite base portion comprises affixing the melt infiltration ceramic matrix composite covering portion onto the portion of the outer surface of the chemical vapor infiltration ceramic matrix composite base portion.

\* \* \* \* \*